United States Patent Office 3,134,056
Patented May 19, 1964

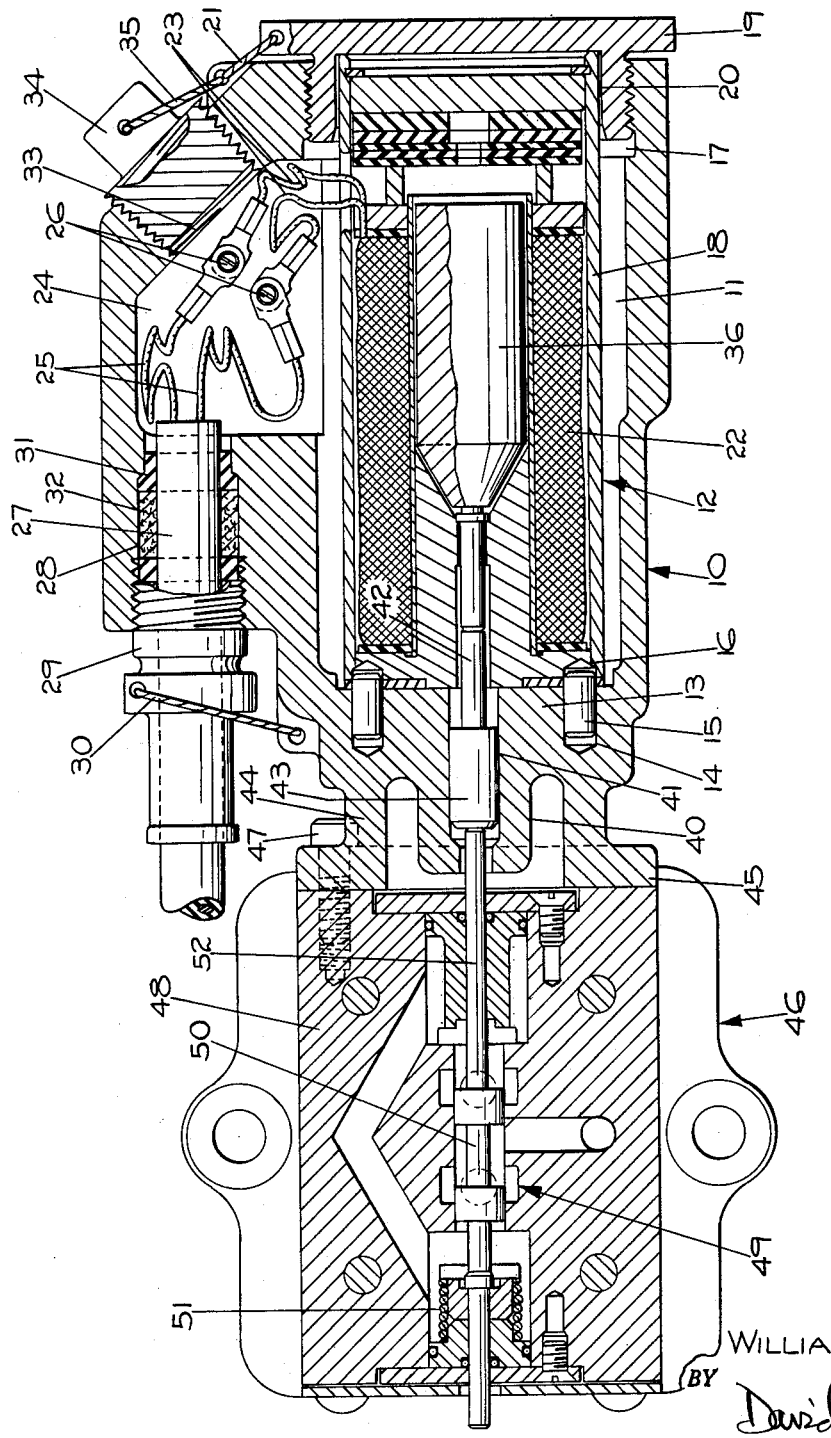

3,134,056
EXPLOSION PROOF SOLENOID HOUSING
William R. Eberle, Columbus, Ohio, assignor, by mesne assignments, to Jeffrey Galion Manufacturing Company, a corporation of Ohio
Filed Dec. 31, 1959, Ser. No. 863,224
1 Claim. (Cl. 317—165)

The instant invention relates to explosion proof housings for electrical devices, for completely enclosing and sealing the electrical device within the housing to prevent the escape of an incendiary spark from the electrical device within the housing, and also to contain any explosion that may occur within the housing.

The explosion proof housing of this invention finds particular utility in connection with coal mining equipment that is operated within the coal mine, where there is constant danger of fire or explosion occurring due to the presence of coal dust which is inflammable, pockets of inflammable gas within the coal seam, as well as the coal itself which is inflammable. Such coal mining equipment is generally operated by electric motors, the circuits of which require various electrical control devices. The coal mining equipment may also include other electrical devices for controls and other purposes not directly related to the electric motors.

In any of the electrical devices included in the coal mining equipment, in which there is any possibility whatsoever of the production of an incendiary spark, either through the normal operation of the electrical device, as may be the case with a switch, or in the case of any malfunction of any electrical device, it is required that the electrical device be enclosed in an explosion proof housing and sealed within the housing to prevent the escape of an incendiary spark to the surrounding atmosphere, which could set off a fire or an explosion. Such explosion proof housings for the electrical devices are made mandatory by federal and State laws and regulations governing coal mining operations. It is usually required of the explosion proof housings that they not only completely seal the electrical devices which are capable of producing an incendiary spark, but also that they withstand the force of, and contain any explosion that may occur within the housing. The explosion proof housing of the instant invention has these features as well as other features, as will be described hereinafter.

It is an object of the instant invention to provide an improved explosion proof housing for an electrical device, in which the electrical device is completely sealed within the housing to prevent the escape of an incendiary spark from the housing, and to contain any explosion that may occur within the housing.

It is another object of the instant invention to provide an improved explosion proof housing for an electrical device having a main chamber for the reception of the electrical device and an auxiliary chamber for electrical lines to the electrical device, with the main chamber being formed with an access opening for placement of the electrical device within the housing, and the auxiliary chamber being formed with an access opening for reaching the electrical lines.

It is a further object of the instant invention to provide an improved explosion proof housing for an electrical device having a main chamber for reception of the electrical device, with an access opening leading to the main chamber through which the electrical device is placed therein, and having a cover for sealing the access opening and engaging the electrical device to secure the latter within the main chamber.

It is also an object of the instant invention to provide an improved explosion proof housing for a solenoid having a reciprocable armature, in which there is provided an extension pin abutting the armature and adapted to be reciprocated by the latter, the housing including a bore into which the extension pin extends, with the extension pin engaging the bore over a substantial portion of the bore surface to seal the housing at the bore.

It is another object of the instant invention to provide an explosion proof housing for an electrical device in which the housing includes an annular wall projecting therefrom and including means for attaching the housing to another device, with the annular wall forming the weak element in the assembly to restrict breakage of the assembly to the annular wall.

Still another object of the instant invention is to provide an improved explosion proof housing for an electromechanical device which is adapted to be operatively connected to a mechanical device for operation of the latter by the electro-mechanical device, in which the housing includes an annular wall formed with means for attaching the housing to the mechanical device, and there being provided mechanical connecting means for operatively connecting the electro-mechanical device to the mechanical device, said connecting means being disposed within the annular wall for protection thereof by the annular wall.

Other objects of the invention will appear hereinafter, the novel features and combinations being set forth in the appended claim.

The drawing herein is a sectional view of an explosion proof housing constructed in accordance with the instant invention, and also illustrating a mechanical device attached to the housing for operation of the mechanical device by the electro-mechanical device which is disposed within the housing.

Referring to the drawing, there is illustrated therein an explosion proof housing 10 constructed in accordance with the instant invention and having a main chamber 11 within which there is received and supported an electromechanical device which may be a solenoid 12. The end wall 13 of the main chamber 11 is formed with several bores 14, in each of which there is placed an aligning pin 15. The solenoid 12 is also formed with several bores 16, corresponding to the bores 14, and adapted to receive the projecting ends of the pins 15 for aligning the solenoid 12 within the main chamber 11.

One end of the main chamber 11 is formed with an internally threaded access opening 17, which is of larger diameter than the cylindrical outer shell 18 of the solenoid 12, to permit the placement of the solenoid 12 within the main chamber 11 through the access opening 17. In placing the solenoid 12 within the main chamber 11, the bores 16 in the end of the solenoid 12 are aligned with, and are mated with the aligning pins 15 to properly locate the solenoid 12 within the main chamber 11.

The access opening 17 is sealed by a cover 19 that is threadedly engaged with the threads of the access opening 17 over a substantial area, the cover 19 being screwed tight in the access opening 17, and by engagement therewith over a substantial area provides a seal for the main chamber 11 to prevent the escape therefrom of any incendiary spark, and to contain any internal explosion within the housing 10.

The cover 19 is formed with a cylindrical socket 20, that is complementally formed with respect to the cylindrical outer shell 18 of the solenoid 12, and is adapted to receive the end of the solenoid 12 therewithin. When the cover 19 is turned into the access opening 17, the end of the solenoid 12 is received within the cylindrical socket 20, and the cover 19 is then turned up tight against the end of the solenoid 12 to lock it in place within the main chamber 11. A locking wire 21 is utilized for securing the cover 19 in place, and preventing it from loosening, as may occur, for example, due to vibration of the apparatus of which the explosion proof housing 10 is an element.

The solenoid 12 includes a winding 22 from which electrical lines 23 are led into an auxiliary chamber 24 formed above the main chamber 11 and which opens into the main chamber 11. The electrical lines 23 are connected within the auxiliary chamber 24 to other electrical lines 25 by means of suitable electrical connectors 26. Electrical power is supplied to the solenoid 12 by the electrical lines 25 and thence to the electrical lines 23, which connect to the solenoid winding 22. The electrical lines 25 are led into the auxiliary chamber 24 by a suitably insulated electrical cable 27, which is held in a bore 28 by a packing nut 29 that is threadedly engaged in the bore 28, and which immovably holds the electrical cable 27 in the bore 28. A locking wire 30 is utilized for securing the packing nut 29, and preventing the latter from becoming loose as may occur due to vibration. There is also provided an insulating bushing 31 surrounding the electrical cable 27 and immovably holding it in the bore 28 at the inner end of the latter. Suitable packing 32 is placed around the electrical cable 27 in the bore 28, between the locking nut 29 and the insulating bushing 31.

The auxiliary chamber 24 is formed with an internally threaded access opening 33, through which the electrical lines 23, 25 may be reached and withdrawn for making connections of these lines to each other. The access opening 33 is sealed by a cover or plug 34, which is formed with threads to be screwed tight into the threaded access opening 33. By engagement of the cover 34 with the access opening 33 over a substantial area, there is provided a seal for the auxiliary chamber 24, which will prevent the escape of any incendiary spark from the explosion proof housing 10, and will also contain an internal explosion therewithin. A locking wire 35 is utilized to lock the cover 34 in the access opening 33 and to prevent loosening thereof, as may occur due to vibration.

The solenoid 12 is an electro-mechanical operating device in which the electrical power supplied to the winding 22 produces mechanical motion of a reciprocable armature 36 that is centrally disposed in the solenoid 12. As illustrated in the drawing, the solenoid 12 is energized and the armature 36 is reciprocated to the left to its maximum position. Upon de-energization of the solenoid 12, the armature 36 is released and reciprocated in the opposite direction to the right, as viewed in the drawing.

The explosion proof housing 10 has a nose 40 projecting from the end wall 13. A cylindrical bore 41 is formed in the nose 40 and extends through the end wall 13 in alignment with the armature 36. An extension pin 42 is disposed in the bore 41 in alignment with the armature 36 and abuts the end of the latter. The extension pin 42 has an enlarged piston portion 43, which is reciprocably engaged with the surface of the bore 41 over a substantial area thereof to provide a seal in the bore 41 for the explosion proof housing 10 to prevent the escape of any incendiary spark from the housing 10, and also to contain any explosion within the housing 10. The piston portion 43 also serves to reciprocably support the extension pin 42 in the bore 41.

The explosion proof housing 10 includes an annular wall 44 surrounding the nose 40. The annular wall 44 is formed at its outer end with a radially extending peripheral flange 45 by which the explosion proof housing 10 is attached to a mechanical device 46. Suitable bolts 47 are threaded through the flange 45 and into the body 48 of the mechanical device 46, for attaching the explosion proof housing 10 to the mechanical device 46.

As illustrated in the drawing, the mechanical device 46 is a hydraulic valve 49 for governing the flow of hydraulic fluid, for example, from a pump to a hydraulic operating mechanism, such as a cylinder and piston hydraulic motor. The hydraulic valve 49 may be of a conventional form having a reciprocable valve spool 50, the position of which within the hydraulic valve 49 governs the flow of hydraulic fluid. The hydraulic valve 49 includes a spring 51 for normally maintaining the spool 50 in a reciprocated position to the right as viewed in the drawing. The spool 50 is reciprocated to the left, to the position shown in the drawing, by the solenoid armature 36, in opposition to the force of the spring 51, which is compressed thereby. The valve spool 50 includes an axially extending operating pin 52 which projects beyond the body 48 and into the bore 41 in the nose 40 of the explosion proof housing 10. The operating pin 52 abuts the extension pin 42, whereby the spool 50 is reciprocated to the left, as viewed in the drawing, by the extension pin 42, when the latter is reciprocated by the solenoid armature 36, the latter being operated upon energization of the solenoid 12. Reverse reciprocation of the spool 50 to the right as viewed in the drawing, is by the spring 51, and occurs when the solenoid 12 is de-energized. The spool 50, acting through the operating pin 52 and the extension pin 42, reciprocates the armature 36 to the right, as viewed in the drawing.

The operating connection of the electro-mechanical device, consisting of the solenoid 12, to the hydraulic valve 49 is made in the nose 40. The annular wall 44 surrounding the nose 40 provides protection for the nose 40 and the operating connection by enclosing the latter. Also, the annular wall 44 forms the weak element in the assembly of the explosion proof housing 10 and the mechanical device 46, so that in the case of breakage of the assembly, such breakage will be limited to the annular wall 44. The bore 41 being sealed by piston 43, there is no possibility in the event of such breakage of the escape of an incendiary spark from the explosion proof housing 10 even though the left hand end of piston 43, as viewed in the drawing, is directly exposed outside the housing 10.

Obviously those skilled in the art may make various changes in the details and arrangement of the parts without departing from the spirit and scope of the invention as defined by the claim hereto appended, and applicant therefore wishes not to be restricted to the precise construction herein disclosed.

Having thus described and shown an embodiment of the invention, what it is desired to secure by Letters Patent of the United States is:

An explosion proof housing for an electrical device comprising, a chamber for said electrical device, said electrical device being a solenoid having a cylindrical outer shell, an access opening in the housing leading to the chamber and through which the solenoid is placed in the chamber, said solenoid abutting a wall of the chamber, a cover engageable by rotation with the access opening for sealing the chamber, the inner face of the cover including a cylindrical socket receiving an end of the solenoid therewithin and securing the solenoid in the chamber between the cover and said chamber wall when the cover is engaged with the access opening, an auxiliary chamber adjacent the first said chamber and connected to the first said chamber for leading electrical lines from said solenoid into the auxiliary chamber, a second access opening in the housing leading to the auxiliary chamber for reaching the electrical lines from said solenoid and connecting said electrical lines to other electrical lines, and a cover for the second access opening for sealing the auxiliary chamber.

References Cited in the file of this patent

UNITED STATES PATENTS

| | | |
|---|---|---|
| 2,452,112 | Eckert | Oct. 26, 1948 |
| 2,817,026 | Robinson | Dec. 17, 1957 |
| 2,901,677 | Chessman et al. | Aug. 25, 1959 |
| 2,931,233 | Griswold | Apr. 5, 1960 |
| 2,975,340 | Jencks et al. | Mar. 14, 1961 |